United States Patent [19]

Viavant et al.

[11] Patent Number: 5,784,566
[45] Date of Patent: Jul. 21, 1998

[54] SYSTEM AND METHOD FOR NEGOTIATING SECURITY SERVICES AND ALGORITHMS FOR COMMUNICATION ACROSS A COMPUTER NETWORK

[75] Inventors: Steven Viavant, Piedmont; Arthur A. Gleckler, Belmont; Richard R. Wessman, Redwood City, all of Calif.

[73] Assignee: Oracle Corporation, Redwood Shores, Calif.

[21] Appl. No.: 583,890

[22] Filed: Jan. 11, 1996

[51] Int. Cl.$^6$ .............................. G06F 15/16; G06F 13/14; G06F 13/38; H04L 9/28
[52] U.S. Cl. .............................. 395/200.59; 395/187.01; 380/49
[58] Field of Search .............................. 380/21, 23, 24, 380/25, 49; 395/200.06, 200.55, 200.57, 200.58, 200.59, 186, 187.01; 340/825.34

[56] References Cited

U.S. PATENT DOCUMENTS

| | | | |
|---|---|---|---|
| 5,230,020 | 7/1993 | Hardy et al. | 380/21 |
| 5,341,426 | 8/1994 | Barney et al. | 380/21 |
| 5,548,646 | 8/1996 | Aziz et al. | 380/23 |
| 5,651,068 | 7/1997 | Klemba et al. | 380/25 |

OTHER PUBLICATIONS

E. Rescorla, A. Schiffman, Jul. 1995, "The Secure HyperText Transfer Protocol", pp. 1–38.

Blaze, M. and Bellovin, S.M., Jun. 5–7, 1995, "Session-Layer Encryption", pp. 85–93, The 5th UNIX Security and Symposium, Salt Lake City, Utah.

Postel, J. and Reynolds, J., May 1983, "Telnet Option Specifications", pp. 1–3.

Rescorla, E. and Schiffman, A., Dec. 1994, "The Secure HyperText Transfer Protocol", pp. 1–38.

Linn, J., Jun. 1995, "Generic Security Service Application Program Interface, Version 2", pp. 1–71.

*Primary Examiner*—Mark H. Rinehart
*Assistant Examiner*—Matt Kaminer

[57] ABSTRACT

A system and a method are described for selecting and initiating security services for communication across computer networks. Negotiation is facilitated between nodes of a computer network to determine whether a security service is to be used, and if so, what particular method of providing the security service will be used. Communication with a wide range of different computer systems using different methods of providing various security services is thereby facilitated.

28 Claims, 9 Drawing Sheets

| NETWORK SERVICES UMBRELLA 120 | | | | | | | | | | | |
|---|---|---|---|---|---|---|---|---|---|---|---|
| DISPATCH LAYER 124 | | | | | | | | | | | COMMUNICATIONS COMPONENT 156 |
| ENCRYPTION SECURITY SERVICE 122 | | | | DATA INTEGRITY SECURITY SERVICE 126 | | | AUTHENTICATION SECURITY SERVICE 154 | | | | |
| RC4 ADAPTER 130 | DES56 ADAPTER 134 | DES40 ADAPTER 138 | *** | MD5 ADAPTER 142 | ADAPTER | *** | KERBEROS ADAPTER 146 | BIOMETRIC ADAPTER 150 | *** | | *** |
| RC4 ALGORITHM 132 | DES56 ALGORITHM 136 | DES40 ALGORITHM 140 | *** | MD5 ALGORITHM 144 | *** | | KERBEROS 148 | BIOMETRIC DEVICE 152 | *** | | *** |

| SERVICE | CLIENT | | |
|---|---|---|---|
| | REQUIRED | DON'T CARE | REJECTED |
| REQUIRED | ON | ON | FAIL |
| REJECTED | FAIL | OFF | OFF |

FIG.8

| SERVER | CLIENT | | | |
|---|---|---|---|---|
| | REQUIRED | REQUESTED | ACCEPTED | REJECTED |
| REQUIRED | ON | ON | ON | FAIL |
| REQUESTED | ON | ON | ON | OFF |
| ACCEPTED | ON | ON | OFF | OFF |
| REJECTED | FAIL | OFF | OFF | OFF |

SYSTEM AND METHOD FOR NEGOTIATING SECURITY SERVICES AND ALGORITHMS FOR COMMUNICATION ACROSS A COMPUTER NETWORK

BACKGROUND OF THE INVENTION

1. Technical Field

The present invention relates to security services for communications in a networked computer environment. In particular, the present invention relates to the negotiation of security services such as authentication, encryption, and checksumming as well as the selection of algorithms for each particular security service. The present invention also relates to providing a key resizing facility for use with multiple security services.

2. Description of the Related Art

In a networked computer environment, various security services for communications between network nodes may be implemented. For example, security services such as authentication, encryption, and checksumming may be provided for communications across a computer network.

Authentication is a security service which verifies that a network user is who he claims to be. Methods of providing authentication include those in which the receiver may query the socket; those using some authentication service, such as a Kerberos server; and those using a cryptographic token which is explicitly passed across the connection. Other methods of providing authentication include physical-device-assisted authentication and biometric authentication. In physical-device-assisted authentication, devices such as "smart cards" may be used to provide a randomly generated, unpredictable access code. Biometric authentication relies on a unique physical characteristic of the user, such as a finger print.

Encryption is a type of security service by which communications over a network are encoded to help ensure privacy of sensitive data. The desired result is to scramble the information in such a way that a person cannot read the message without an "encryption key." Thus, the encryption key should only be known to the sender and receiver.

Various algorithms may be used for encryption. For example, RC4, developed by RSA Data Security, Inc., has become widely used as a method for high speed encryption. RC4 has the advantage of providing relatively good security with relatively low total performance degradation. The Data Encryption Standard ("DES") algorithm has been the U.S. government standard for many years, and is sometimes mandated in the financial services industry. In most specialized banking systems in use today, the DES algorithm is used to protect large international monetary transactions. DES is available in a domestic version, sometimes referred to as the DES 56 algorithm, which uses a 56-bit encryption key. DES is also available in modified versions, such as DES 40, which uses a 40-bit encryption key.

The traditional method of encrypting network data is to add hardware boxes or boards to each of the nodes in a network. Alternatively, encryption boards or boxes can be added to all of the wide-area links within a company, typically by adding proprietary boards to routers or bridges. Hardware-based encryption has the disadvantages of relatively high cost and limited compatibility with various hardware platforms as well as with various types of network protocol. Moreover, since hardware devices sit at a low level of the Network "stack," which is made up of software layers and hardware devices, they have no ability to tell which process is creating the data they receive when it arrives at the hardware interface. Thus, hardware-based encryption methods are typically inflexible in that either all network traffic must be encrypted or none of it.

Ordinary encryption makes reading messages nearly impossible, but does not protect against changes to the data. For data integrity another type of security service, known as tamper detection or crypto-checksumming ("checksumming"), helps to ensure that data has not been altered during communication on a computer network. In checksumming, the sender periodically interjects a special item called a "checksum" into a data stream being sent to the receiver. By examining the checksum, the receiver can determine whether the data has been modified during transmission.

As with encryption, many algorithms may also be used for checksumming. For example, MD5 has become an industry-standard algorithm for cryptographic checksumming. According to the MD5 algorithm, a checksum or message digest is added to each packet during transmission. When the packets are received at the destination, they are immediately checked for data modifications. If a modification is discovered, the violation may be recorded in the system log files, and any operation in progress when tampering took place may be immediately terminated.

Although many of the security services described above are commonly used in communications across computer networks, and users may sometimes be able to specify a particular security service, most network systems do not provide a choice as to which particular algorithm to use for the specified security service. Computer security services are typically "hard-wired" into a computer system so that only a single method or algorithm for providing a security service is available.

Some related art systems allow users to specify a security service and algorithm on a "per message" basis. For example, a system may allow the sender to specify in each message header an algorithm for a security service. The receiver examines each message header to determine which security service and algorithm to use. The specification from the message sender is treated as an absolute demand for the particular service and algorithm. If, for some reason, the receiver cannot use the specified service or algorithm, the communication fails. Such failure may occur, for example, if the receiver lacks the facilities to provide the specified algorithm. Failure may also occur if the receiver of the message is under instructions not to use a particular algorithm even though it is physically able to do so. For example, various countries regulate which encryption algorithms, and what key sizes, may be used within their boundaries. Failure might also occur if the receiver is unwilling to accept the performance degradation of the particular algorithm specified by the sender.

Where one party simply demands a particular service, communication may fail even if it would have been mutually satisfactory not to use the particular service. For example, suppose a first party prefers that checksumming be used, but does not consider it necessary. In prior art systems, the party's only choices would be to specify checksumming or not. If the party specifies checksumming and the other party is unable to provide checksumming, the communication will fail even though it would have been satisfactory for both parties not to have used checksumming. By providing only a binary "take it or leave it" choice, the parties may end up in a situation which is less than optimal. For example, if the first party chooses not to specify checksumming, and the other party could have provided it, checksumming will not be used even though to use it would have been possible and even preferred by the first party.

Furthermore, under a binary "take it or leave it" structure, the communication may proceed in a less than optimal fashion or even fail when a preferred algorithm is specified by one party. For example, if the first party specifies a version of DES encryption which the receiver cannot provide, the communication will fail even though another algorithm such as RC4 may have been acceptable to both the sender and the receiver.

As computer networks continue to grow, computer security will be increasingly required to ensure that confidential communications are not intercepted by any of the large number of users who could potentially intercept the communications. Furthermore, larger networks will increasingly be connecting different types of computer systems which often have different preferences for security services and algorithms.

SUMMARY OF THE INVENTION

For the foregoing reasons, it would be desirable in a networked computer environment to facilitate negotiations between computers to determine a mutually satisfactory selection of security services and algorithms. In particular, it would be desirable to provide a negotiation process where at least one party has the option of indicating a preference for a service or algorithm, although the service or algorithm may not be required by that party.

It would further be desirable to provide in a networked computer environment the ability to choose between several different methods or algorithms for providing security services. This would advantageously allow flexibility for expanding networks which may connect different types of computers using different types of algorithms. This would also advantageously allow users to add their own algorithms which may not be available from the software or hardware platform supplier.

Thus, according to the present invention, a system and method for selecting security services for communication across a computer network is provided. The invention allows computer nodes to express preferences for security services and to come to agreement on mutually satisfactory methods and algorithms for providing security services.

More specifically, the invention provides for determining whether a security service will be used for communication between two nodes in a networked computer environment by selecting preferences for using a security service at each of two nodes, communicating at least one of the preferences between the nodes, comparing the preferences of each node, and determining if the security service should be used.

The invention further provides for selecting a method for the security service by creating at each node a list of acceptable methods for the security service, communicating at least one of the lists of methods to the other node, and selecting a mutually satisfactory security method, if one exists, by comparing the lists of acceptable methods.

BRIEF DESCRIPTION OF THE DRAWINGS

These and other methods, structures, features, aspects, and advantages of the present invention, will become more readily apparent from the following detailed description, which should be read in conjunction with the accompanying drawings, in which:

FIG. 3 illustrates a preferred embodiment of the network services architecture which provides network security functions;

FIG. 7 is a table of outcomes for combinations of client and server preferences relating to whether or not a security service should be used, according to one embodiment of the invention;

FIG. 8 is a table of outcomes for combinations of client and server preferences relating to whether or not a security service should be used, according to a preferred embodiment of the invention;

DETAILED DESCRIPTION OF THE PREFERRED EMBODIMENTS

The following detailed description of the preferred embodiments of this invention is meant to be illustrative only of the principles of this invention and is not intended to limit the invention to the embodiments described herein. Other embodiments of this invention, having broader application, will be obvious to those skilled in the art in view of this disclosure.

The following detailed description refers to a computer node at one end of the communication as a "client" and a computer node at the other end as a "server." These labels simply distinguish between two ends of a communication and are in no way meant to restrict the invention to client-server architectures. Thus, the labels "client" and "server" may apply interchangeably to any node on a computer network.

Figure 1:
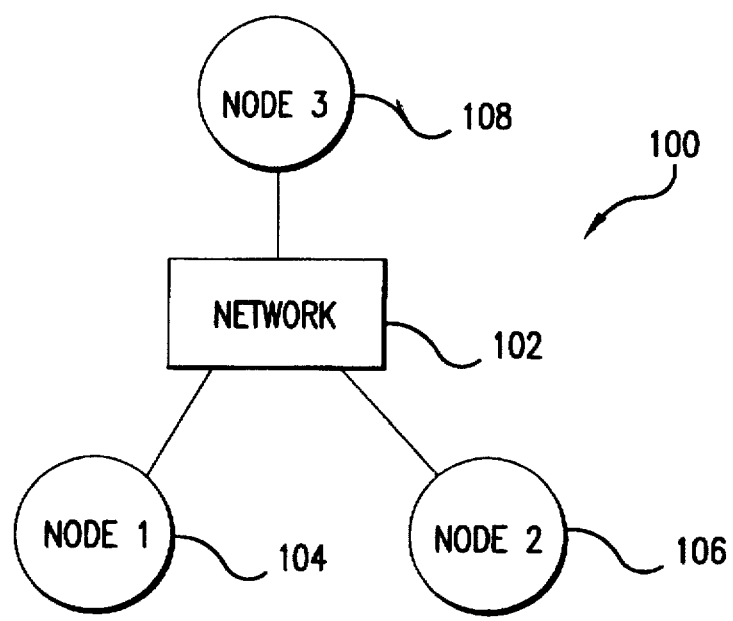
FIG. 1 illustrates connections between a computer network and individual computer nodes.

FIG. 1 illustrates an example of a networked computer environment 100 in which a network 102 is connected to, and facilitates communication between, computer nodes 104, 106, and 108. Although network 102 is shown to connect three nodes, this invention is equally applicable to a network which connects as few as two nodes, or as many as millions of nodes. Network nodes may exist in the same building or they may be geographically distributed, even across different continents.

Figure 2:
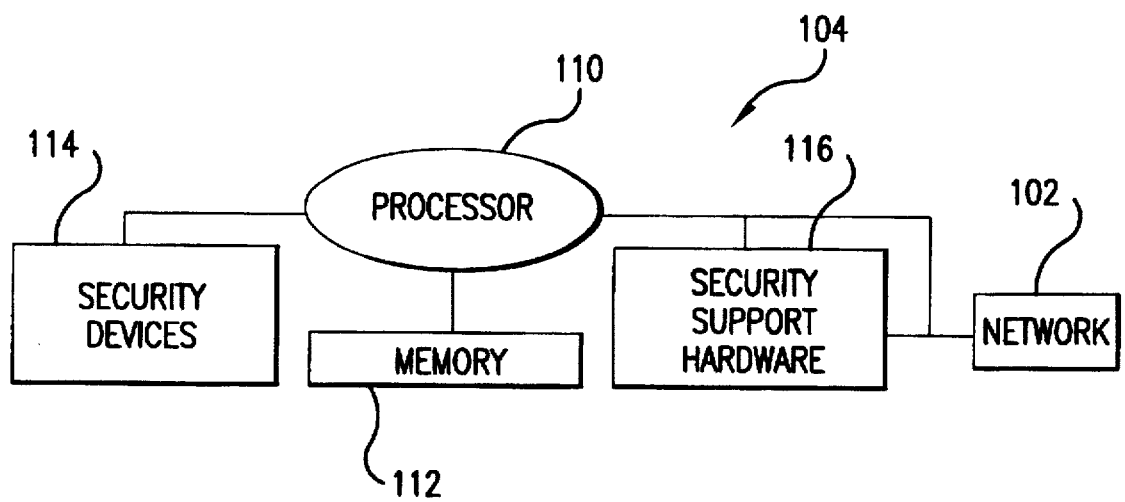
FIG. 2 illustrates one possible internal structure for a computer node.

FIG. 2 illustrates one possible internal structure for a computer node. As shown, computer node 104 ordinarily comprises a processor 110 connected to a memory 112. Node 104 may include security devices 114, which may be used to facilitate a particular security service. For example, security devices 114 may include a magnetic card reader or fingerprint verification facility. Node 104 may also have security support hardware 116 provided to facilitate security services such as encryption and checksumming. The processor communicates with network 102 either directly, or indirectly through security support hardware. Other interconnections between the elements in FIG. 2 are of course possible, and nodes may contain additional components not illustrated in FIG. 2. For example, a network interface is often present between network 102 and processor 110 or security support hardware 116.

FIG. 3 is a diagram of a network services architecture capable of providing network security functions according a preferred embodiment of the invention. The network services architecture comprise network services umbrella layer 120 which ordinarily contains one or more network security services. For example, FIG. 3 shows an encryption security service 122, a data integrity security service 124, and an authentication service 126 residing under network services umbrella layer 120. Above the network services umbrella layer 120 ordinarily resides some transport layer. An example of one such transport layer is SQL*Net® developed by Oracle Corporation. Network services umbrella layer 120 preferably is able to operate with alternative transport layers so that applications from alternative suppliers may easily be supported by the security services described herein. Although FIG. 3 depicts an embodiment having three security services, namely encryption, checksumming, and authentication, in general any number of security services, or other services, may be provided. For example, a data compression service might be provided, which requires negotiation of a common choice of data compression algorithm.

Each network security service ordinarily contains one or more adapters which connect the service to a particular method or algorithm for performing the service. As shown in FIG. 3, Encryption security service 122 comprises RC4 adapter 130, DES 56 adapter 134, and DES 40 adapter 138, which use RC4 algorithm 132, DES 56 algorithm 136, and DES 40 algorithm 140 respectively. Although three adapters are shown in FIG. 3, in general any number of adapters and algorithms may be used for each security service type. Similarly, data integrity security service 124 comprises MD5 adapter 142 which uses MD5 algorithm 144, and Authorization security service 126 comprises Kerberos adapter 146, and Biometric adapter 150, which use the Kerberos and Biometric methods respectively.

Dispatch Layer 154 comprises a set of callback functions, which facilitate connections to services. These functions allocate and initialize data structures used by the connections, initialize connections, provide information about security services, and terminate connections to services. The dispatch layer calls each of these functions.

In the initialization phase, the dispatch layer cycles through an array of service entries calling the information function for each. After the information functions are called, the dispatch layer calls the initialization function for each service. The initialization function returns which adapters, if any, are linked in for the service and whether or not the service is required.

In the connection phase, the supervisor similarly cycles through the array of service entries, repeatedly calling services. One difference between the connect function for the client and the connect function for the server is that on the first call, the client sends information while the server waits for information.

After the connection phase is complete, some services, such as encryption security service 122 and data integrity security service 124, may have to do some additional cleanup activity. Accordingly, an additional "connection completion" function may be provided for that purpose. After the services are connected, the dispatch layer allows the calling process to directly access the subordinate services.

During disconnect, the dispatch layer calls a disconnect function for each service. The disconnect functions are re-entrant and can be called repeatedly without ill effect.

Communications component 156 provides a number of facilities: (1) it insulates the services from method of transport, which is useful for moving from one means of communication to another; (2) it provides a consistent way to transmit and receive data between machines that use different byte layouts; (3) during transmission, communications component 156 bundles transmissions from different services together, and when each portion of the connection phase is finished, it transmits the data to the other processes; and (4) during reception, communication component 156 segregates incoming data by service, organizes it into separate queues for each service, and verifies that the type of data received is the type of data requested.

Figure 4:
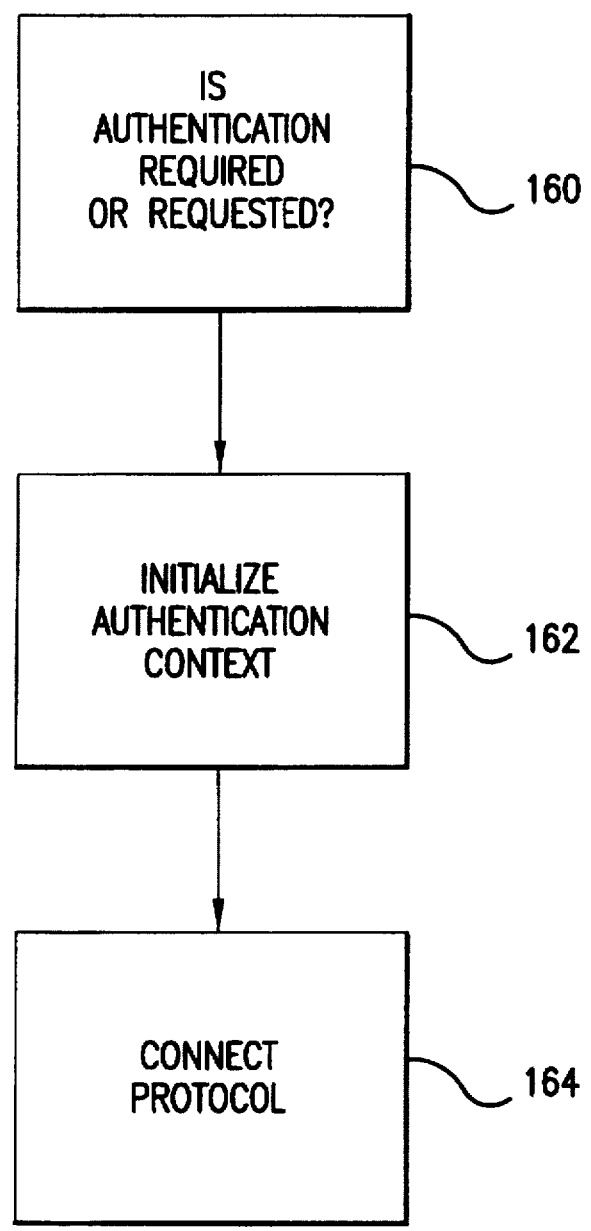
FIG. 4 illustrates steps required to perform authentication.

FIG. 4 illustrates how an authentication security service may be engaged. According to a preferred embodiment, the authentication service is handled differently than encryption or checksumming. This is because authentication is typically performed periodically, whereas encryption and checksumming are either enabled or disabled for all data transmissions during a connection between two nodes.

The server may handle authentication in one of two ways. If the client passes authentication information, the server validates it by calling an authentication adapter. However, if the client does not pass authentication information and the communications protocol supports it, the server attempts to perform authentication implicitly, by querying the network socket to verify the identity of the client.

As FIG. 4 illustrates, in step 160 each process determines if authentication is required or requested. If authentication is required or requested, in step 162, the process allocates and initializes a context structure for authentication. In step 164, the process then commences the connect protocol.

Figure 5:
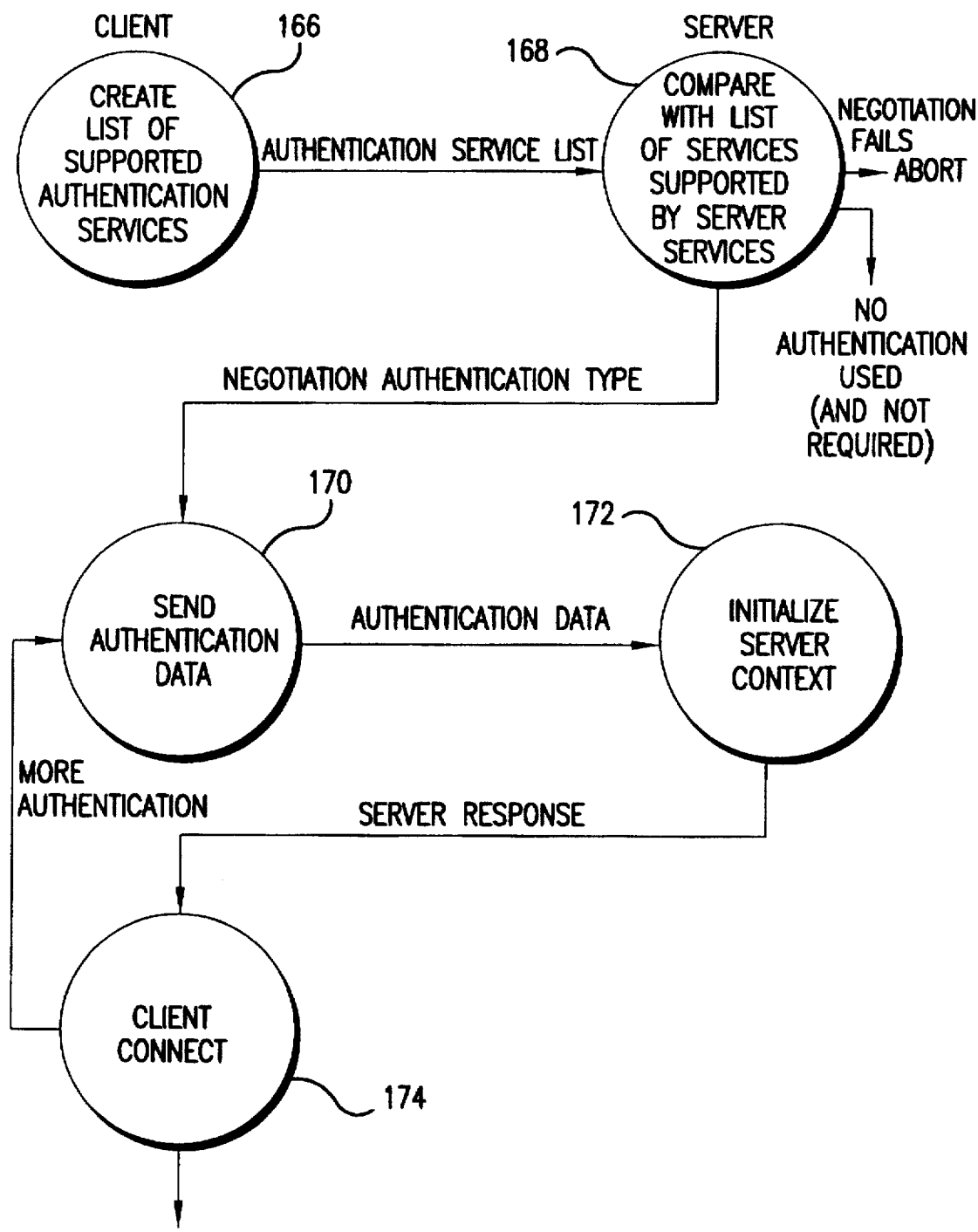
FIG. 5 illustrates how the connect protocol operates in the preferred embodiment.

FIG. 5 illustrates in further detail the connect protocol of step 164, according to a preferred embodiment of the invention. As shown in FIG. 5, at step 166 each process first composes a list of authentication service methods which it supports. This list may be ordered by preference, such that if a user prefers a particular method, it appears at the front of the list. The client then sends its list to the server. In step 168, the server compares the client's list with its own list to determine if the processes share an authentication method. The server then sends back one of the following responses: (1) an error number—indicating that an error occurred during the search; (2) authentication required—indicating that the server does not support any of the methods the client specified, and authentication is required by the server; (3) authentication type—describes the authentication method to be used. The server ordinarily uses the first authentication method it supports in the client's list; or (4) no authentication—indicating the client and server could not agree on an authentication service method, however, authentication is not required. If agreement has been reached on an authentication type, the server calls the initialization and function of the adapter corresponding to the agreed-upon authentication method.

If the negotiation fails, the client aborts the connection as shown in step 168. Note that no failure occurs if authentication is not required by either process, even though the server does not support any authentication services in common with the client.

If the negotiation does not fail and authentication will be used, in step 170, the client: (1) calls the initialization function of the agreed-upon authentication method; (2) calls the connect function for the authentication method; (3) obtains an authentication credential using the retrieval function of the authentication adapter; and (4) sends the credential to the server.

In step 172, upon response from the client, the server: (1) initializes its context using the agreed-upon authentication method; (2) stores the data about the client into its authentication context; and (3) calls the validation function of the authentication adapter.

The next action taken by the server depends upon the status returned by the validation function of the authentication adapter. If the status returned is "successful," the server returns that status and other information to the client. If the status returned is "negotiation not complete," the server returns to the client a "more authentication required" status and other data specific to the authentication method. This status may occur, for example, if the particular authentication method chosen requires more than one authentication call. If the status returned is "failure," the server simply returns the failure status to the client.

Next, in step 174, the client performs one of the following actions depending on the server response in step 172. If the server indicates "success," the client stores any return data in the authentication structure. If the server indicates "more authentication", the client uses the returned data, if any, to repeat the connection process as illustrated by the loop arrow in FIG. 5. If the server indicates "failure," the client aborts the connection.

After the connect protocol is complete, the "connection completion" routine is called. If it was decided during the negotiation that no external authentication is to be used, resources used by the authentication method will be released.

According to preferred embodiments of the invention, the negotiation process for security services other than authentication, such as encryption and checksumming are handled differently than the way authentication is handled. According to one embodiment, the negotiation process for encryption or checksumming may be divided into two parts. The first part determines whether a particular service such as encryption or checksumming will be used. If the service will be used, the second part of the negotiation determines which method of providing the service will be used.

Figure 6:
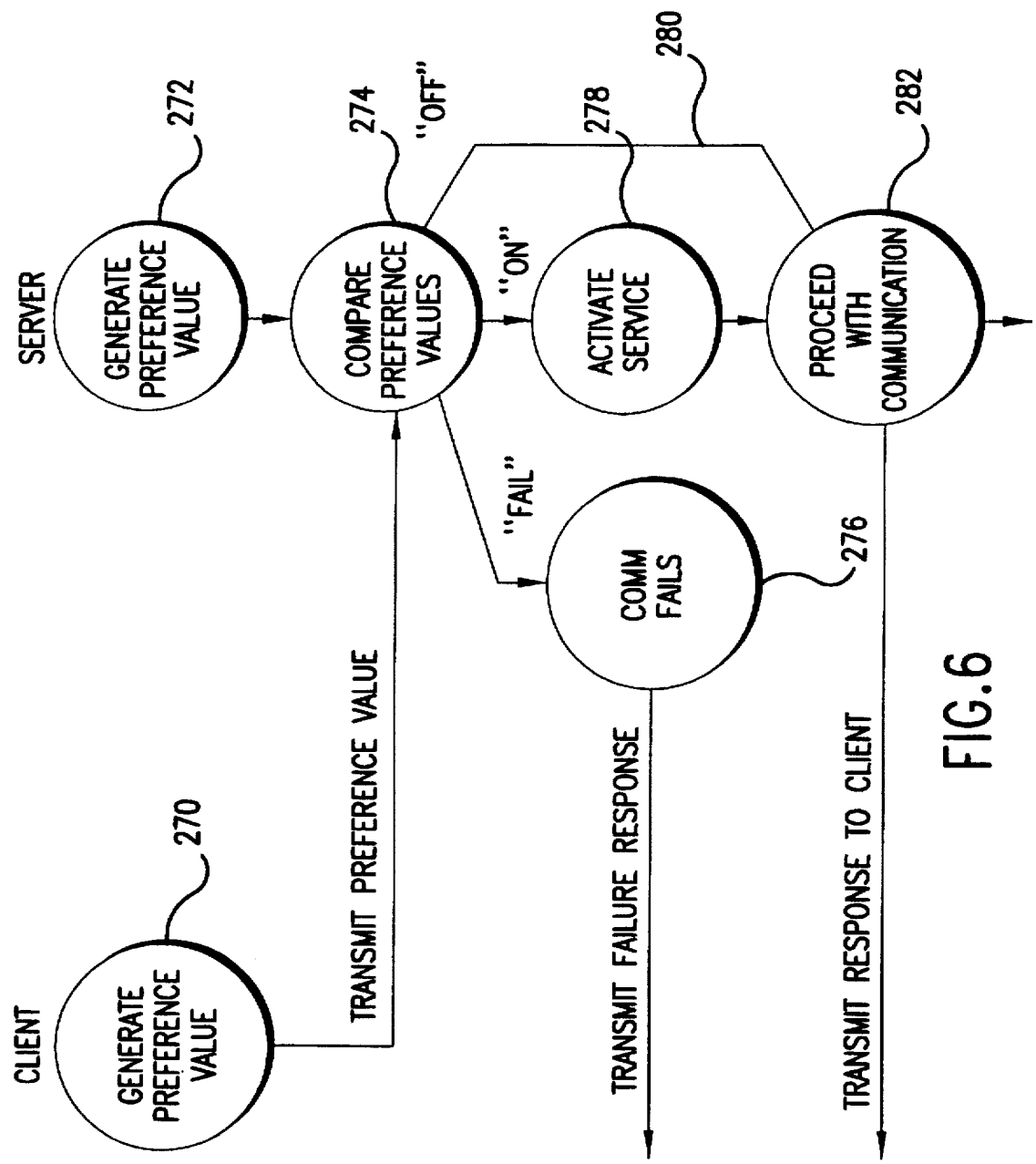
FIG. 6 illustrates a part of the negotiation process for a security service according to one embodiment of the invention.

FIG. 6 illustrates the first part of the negotiation process, according to one embodiment of the invention. As shown, in steps 270 and 272, both the client and the server generate preference values. Preference values, as will be further discussed below, represent particular preferences for using a particular security service. In step 274, the preference values are compared. As a result of the comparison in step 274, one of three outcomes may result. The communication may fail, as shown in step 276. If the communication does not fail, the security service may either be activated, as shown in step 278, or the communication may proceed without the service being used as shown by arrow 280. In any case the server ordinarily sends a response back to the client indicating the outcome of this part of the negotiation process.

Ordinarily, each party will at least have two options in expressing its preference for the service in question: a "required" value which indicated that the service is required for the communication; and a "rejected" value which indicates that the service cannot be used by the party. Additionally according to the invention, one or more additional possible values are provided to at least one party. Adding additional intermediate values beyond "rejected" and "required" advantageously helps prevent needless communication failures due to one party specifying "required" or "rejected" when the service was actually only preferred, and also advantageously helps prevent agreement on a service or algorithm which is less than optimal.

Thus, according to one embodiment of the invention, at least one party is provided with an additional value. The additional value may be called a "don't care" value, which indicates that the particular service is neither "rejected" nor "required", and that either using the service or not would be satisfactory.

FIG. 7 is a table of outcomes of this part of the negotiation process according to one such embodiment. Note that if the client specifies the "Don't care" value, the security service in question will be used if the server requires it, and the service will not be used if the server rejects it.

According to another embodiment of the invention, both the client and the server are able choose from four possible preference values.

| Value | Meaning |
|---|---|
| "required" | Indicates that a service is required for the communication. The service must be active, and the connection will fail if the other side specifies "rejected" or if there is no compatible algorithm on the other side. |
| "requested" | Indicates that a service is not essential, but is preferred. The service will be active if the other side specifies "accepted", "requested", or "required" and there is a compatible algorithm available on the other side; it will be inactive otherwise. |
| "accepted" | Indicates that a service is not essential, but is not preferred. The service will be active if the other side of the connection specifies "requested" or "required" and there is a compatible algorithm available on the other side; it will be inactive otherwise. |
| "rejected" | Indicates that the service must not be used, and the connection will fail if the other side specifies "required." |

If one party fails to specify a preference value for a particular service, a value of "accepted" may be assigned by default if that service is available, or a default value of "rejected" may be assigned if that service is not available.

FIG. 8 presents the outcomes for the possible combinations of client and server preferences, according to an embodiment of the invention in which each party's preference has the above four possible values. If the outcome is "fail" then the communication will fail since one side specified the service is required, and the other side specified it is rejected. If the outcome is "off", the service will not be activated, but the connection will still be made. If the outcome is "on", the service will be activated if the two sides of the connection have an algorithm in common. If the outcome is "on" and two sides do not have an algorithm in common the communication will fail if either side specified a "required" value. If there was no algorithm in common, but neither side of the connection specified "required", then the service will not be activated and the connection will be made. Although the different preference values have been described in terms "required", "requested", "accepted", and "rejected", many other labels may be used to indicate different levels of preference. Additionally, in general, any number of possible preference values may be provided to either side of the connection.

Figure 9:
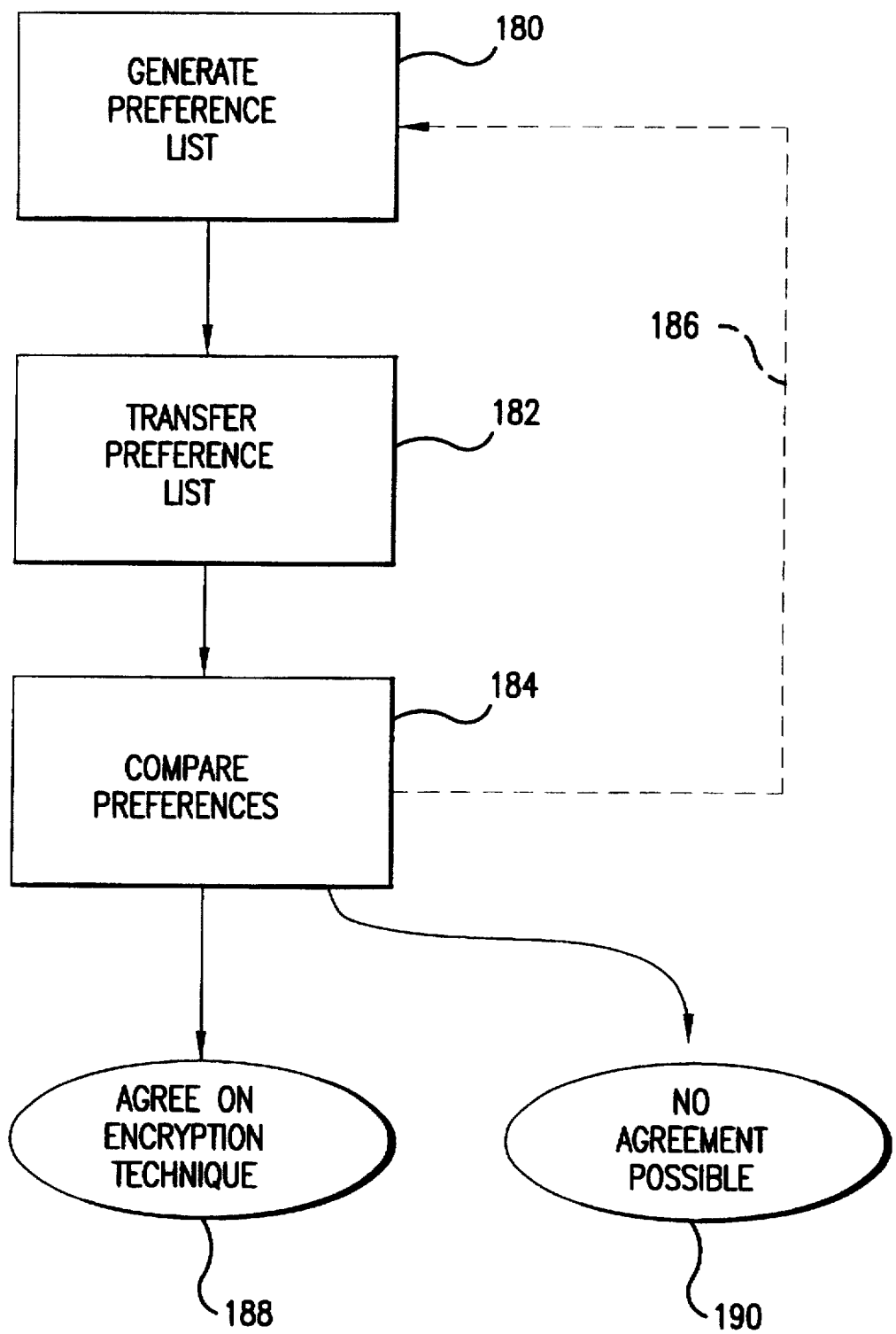
FIG. 9 illustrates the second phase of the negotiation process, which selects a particular method or algorithm of providing a security service.

FIG. 9 illustrates the second part of the negotiation process, which selects a particular method or algorithm of providing a service. In step 180, the client and server both generate lists of service methods they are willing to use. In general, step 180 may be done at any time. For example the server may create a single list during its own set up procedure, or it may create a separate list for each connection, depending on the identity of the client. Preferably the lists are ranked, such that a party's most preferred algorithm or method is first on the list. In step 182, the client, server or both transmit their preference lists to the other side. In step 184, the lists are compared to determine if a particular method can be agreed upon. If the lists are in a prioritized order, the comparison in step 184 may also select the highest priority method or algorithm if more than one match is found. As is indicated by the dashed arrow 186 in FIG. 9, the process of generating and comparing preference lists may repeat multiple times before a service method is agreed upon, or until it is determined that no agreement is possible.

According to a preferred embodiment of the invention, both parts of the negotiation process may advantageously be combined into a single exchange of preferences, thereby simplifying and expediting the negotiation process. The preference value selected in the first part of the negotiation process can be effectively incorporated into the list of preferred service methods by using a NULL value to indicate the preference for not using any algorithm for the security service. In other words, the NULL value indicates a preference not to use the security service at all. A list consisting solely of a NULL value indicates a service is "rejected." A list containing service methods, but no NULL value, indicates that a service is "required." A list containing a NULL value in the first position indicates a service is "preferred." Finally, a list containing a NULL value in the last position indicates a service is "accepted."

If the client side of the connection fails to specify a set of methods or algorithms for a particular service, all methods available on the client side may be considered acceptable as a default condition. Additionally, if the server side fails to specify a list of methods, the process may revert to using a predetermined default order of preference.

Figure 10:
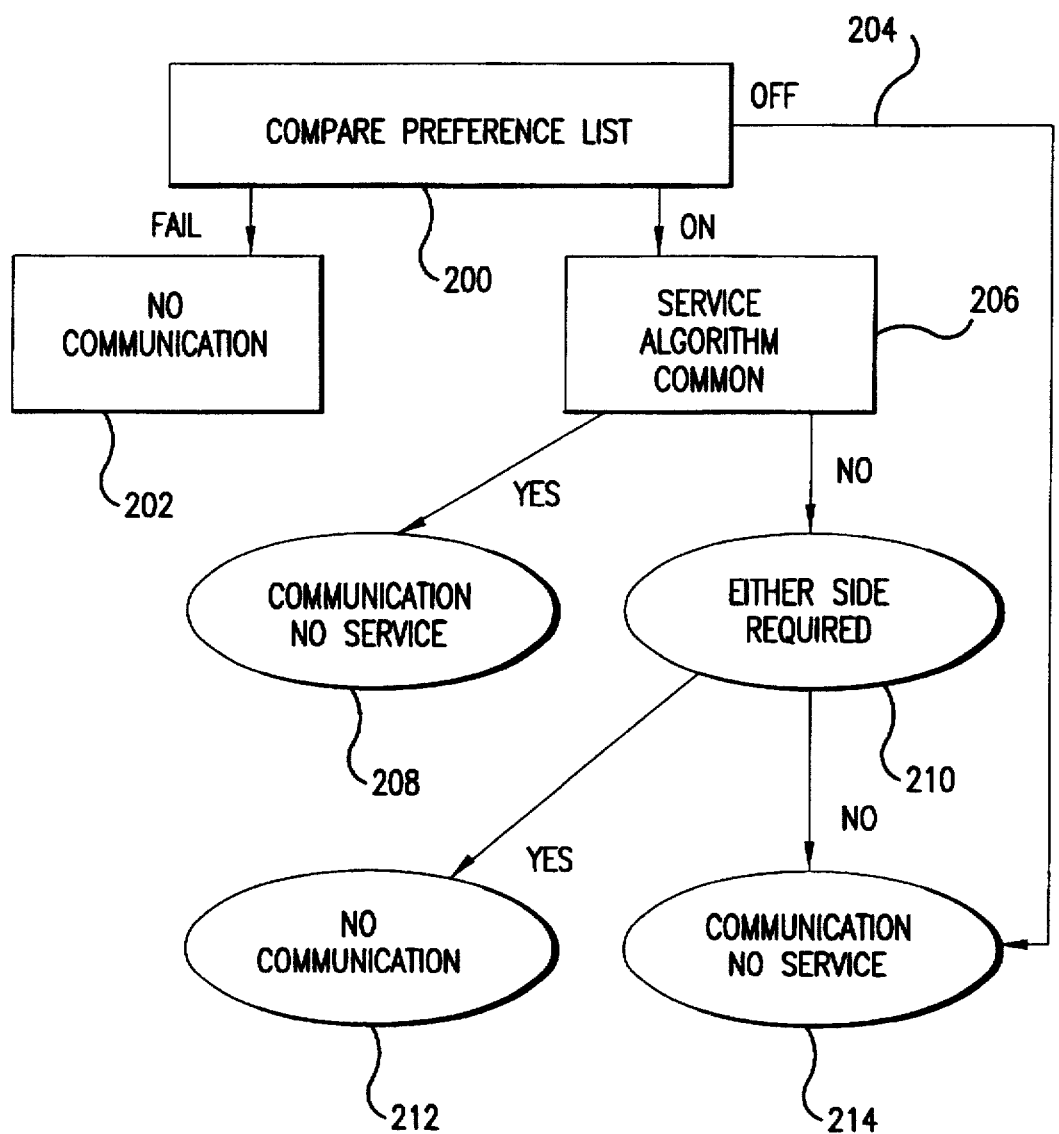
FIG. 10 illustrates how a preferred embodiment determines if the communication will proceed, and if so whether a security service will be used.

According to a preferred embodiment of the invention, FIG. 10 illustrates a scheme which may be used to decide whether a service will activate. In step 200 the preference lists are compared using the table in FIG. 8. In step 202, if the result is "fail", the communication will not proceed. If the result is "off", as indicated by arrow 204, the service will not activate, but communication will proceed.

Several outcomes are possible if the result is "on." In step 206, the lists are compared to determine if there is a service algorithm in common. In step 208, if the two sides have a service algorithm in common, the service will be active and the communication will proceed using an algorithm in common. In step 210, if the two sides do not have a service method in common, the outcome depends on whether either side specified "required." In step 212, if either side specified "required," the connection will fail. In step 214, if neither side specifies "required," the service will be inactive and communication will proceed.

According to one embodiment of the invention, an additional field may be encoded and included with the negotiation information being transmitted between the client and server when a service such as encryption is activated: a "sanity check" value. This value may be the result of one side encrypting a fixed quantity known in advance by both ends of the connection, which may be hard-coded into the software. The other side, upon receiving the sanity check value will compare the resulting value to the value with the chosen encryption algorithm and will signal an error if the two encrypted values do not match.

According to another embodiment of the invention, both the client and server may be able to activate or deactivate encryption and checksumming over the course of a connection, but either side will be able to stipulate, when the connection is opened, that deactivation is forbidden. The network software itself may be responsible for enforcing this requirement, so that no application program may be allowed to violate it. The ability to activate and deactivate algorithms during the course of a connection advantageously allows for the concealment of certain data such as password changes, without requiring encryption on other data. This may be desirable given that some encryption algorithms are slow, and others cannot be exported except for use in protecting passwords.

In a further embodiment of the invention, application programs may be able to control the use of encryption on a connection through connect-time settings and later, once the connection has been established, by means of runtime control. At connect time, the application should be able to control whether encryption: (1) is to be available at all; (2) is to be active when the connection first opens; (3) may be deactivated during the course of the connection; and (4) is automatically activated or deactivated when the other side activated or deactivated it, respectively. This feature advantageously makes it possible for one end of the connection to send encrypted data while the other end sends unencrypted data. Once the connection is established, each application may be able to: (1) deactivate encryption, subject to other requirements; and (2) reactivate encryption. Alternatively, another embodiment might only give the ability to activate or restore encryption if encryption was activated when the connection was opened.

Although the foregoing embodiments have been described with reference to two nodes, namely a client and a server, the invention is also applicable to negotiations between more than two nodes. For example, a three node negotiation is possible, and in a similar fashion to the two-node embodiments, each node would select its own preference value and lists of algorithms for a particular service; transfer the information to at least one of the nodes. Upon comparing the preferences and lists, it would be determined whether or not to use the service, and if so a particular algorithm would be selected.

According to a further preferred embodiment, performance may advantageously be enhanced in several ways: (1) the mechanism which checks whether a service is to be used may be implemented through macros instead of functions to reduce the amount of time wasted by unnecessary function calls when no service is enabled; (2) negotiations for services such as authentication, encryption and checksumming may be combined into the same packets, so that the total number of packet transfers required to negotiate all security services is reduced; and (3) data buffers and packet lengths may be expanded, or structured to be expandable to accommodate the differing amounts of data expansion arising from different encryption and checksumming methods.

Figure 11:
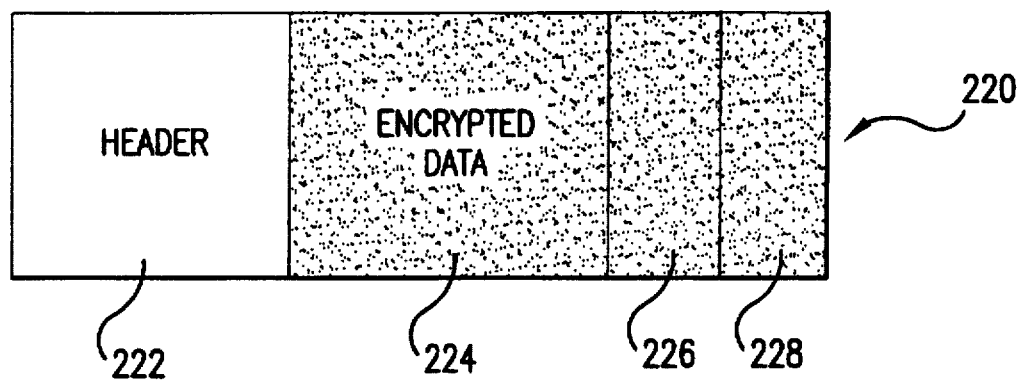
FIG. 11 illustrates a packet format according to a preferred embodiment of the invention.

According to a preferred embodiment of the invention, FIG. 11 illustrates packet format 220 which provides for expanded data packet lengths. Packet format 220 is illustrative of a situation where both encryption and checksumming are used. As shown in FIG. 11, packet format 220 comprises a header field 222, encrypted data field 224, length of unencrypted data 226, and cryptographic checksum 228. Header field 222 is shown being unencrypted, while data fields 224, 226 and 228 are shown as being encrypted. Field 226 contains, in encrypted form, the length of the unencrypted data. According to this embodiment, field 226 is included in the packet whenever the data has been encrypted. It is not necessary to include, in field 226, the unencrypted length of the cryptographic checksum 228, since that ordinarily has a fixed length for each algorithm, regardless of the size of the data. In order to encode the length of the unencrypted data in a fixed-length section of the packet, such as field 226, the maximum amount of data that can ever appear in a packet needs to be known. If a fixed upper bound on the amount of expansion expected for any encryption algorithm is known, it is possible to encode the difference between the sizes of the encrypted and unencrypted data. Note that if a driver for an encryption algorithm never expands the data, field 226 may be omitted altogether.

Figure 12:
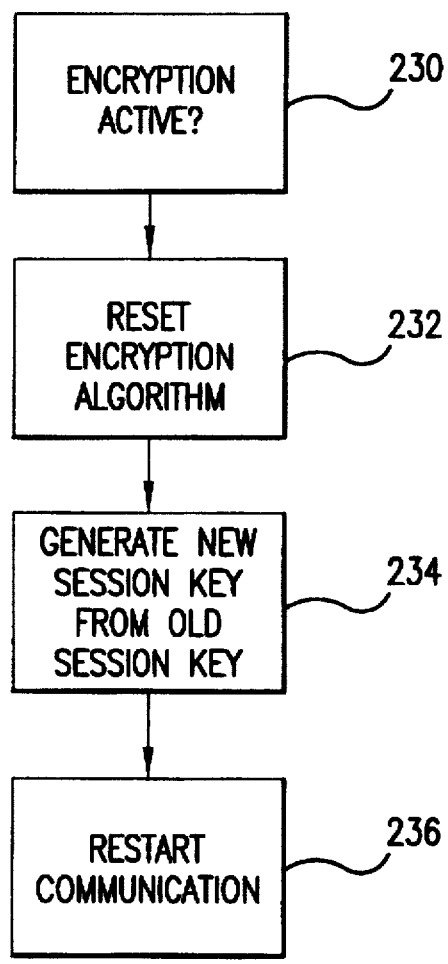
FIG. 12 illustrates how a security service is restored and reset during breaks in communication.

FIG. 12 illustrates how breaks in communication are handled when a security service is active. In step 230, the system first checks to see if a security service is active. If so, the security service is reset in step 232. In step 234, a new key is produced from the old key through a predetermined function at both server and client. One such predetermined function is to exclusive-OR the key with a predetermined random bit pattern. In step 236 the communication is re-started. In this way, both sides may re-synchronize without communication.

We claim:

1. In a networked computer environment, a process for determining whether a security service will be used for communication between a first node and a second node, comprising the steps of:

selecting in the first node, a first preference value for the security service;

selecting in the second node, a second preference value for the security service, at least one of the first or second preference values being selected from a set of values comprising a value representing that the security service is required, a value representing that the security service is rejected, a first intermediate value representing that the security service is preferred but is not essential, and a second intermediate value representing that the security service is not preferred but will be tolerated;

communicating between the first and second node at least one of the first or second preference values;

comparing the first preference value with the second preference value;

determining that the security service will be used when neither the first or second preference values represent that the security service is rejected and both preference values do not include the second intermediate value;

determining that the security service will not be used and that communication between the first and second nodes should proceed when both preference values include the second intermediate value, or when one preference value represents that the security service is rejected and the other preference value does not represent that the security service is required; and determining that communication between the first and second nodes should not proceed when one of the preference values includes the value representing that the security service is required and the other preference value includes the value representing that the security service is rejected.

2. The process of claim 1, further comprising the steps of:
creating in the first node a first preference list;
creating in the second node a second preference list, the first and second preference lists including one or more acceptable methods for the security service;
communicating between the first and second node at least one of the first and second preference lists; and
selecting a method for the security service by comparing the first preference list with the second preference list.

3. The process of claim 2, wherein the first preference value is included in the first preference list and the second preference value is included in the second preference list.

4. The process of claim 3, wherein the first preference value is included in the first preference list by selecting members of the first preference list from a set which includes a null value, and by ordering the preference list according to priority, and wherein the null value represents not using the security service, and the position of the null value in the ordered preference list indicates the first preference value.

5. The process of claim 1, further comprising the step of deactivating the security service in response to an instruction from one of the first or second nodes.

6. The process of claim 5, further comprising the step of re-activating the security service in response to an instruction from one of the first or second nodes.

7. The process of claim 1, further comprising the steps of:
encrypting a set of data and the length of the set of data;
creating a data packet including the encrypted form of the set of data and the length of the set of data; and
communicating the data packet between the first and second nodes.

8. The process of claim 1, wherein the security service is an authentication process and further comprising the steps of:

communicating from the first node to the second node authentication data;

verifying in the second node the identity of the first node using the authentication process; and communicating from the second node to the first node a response representing the result of said step of verifying.

9. In a networked computer environment including multiple nodes, a process for selecting whether a security service will be used during communication between a first node and a second node and for selecting a method for the security service, said process comprising the steps of:

creating in the first node a first preference list;

creating in the second node a second preference list, the first and second preference lists including acceptable methods for the security service, each of the first and second preference lists being ordered by priority and includes a null value when the security service is not essential, wherein the null value represents not using the security service, and the position of the null value in each ordered preference list indicates strength of preference for not using the security service;

communicating between the first and second node at least one of the first and second preference lists;

comparing the first preference list with the second preference list;

determining that the security service will be used when both the first and second preference lists include methods other than the null value, both preference lists do not indicate that the security service is not preferred but will be tolerated, and a match is found between the first and second preference lists; and selecting a method for the security service by selecting a method contained in both preference lists.

10. The process of claim 9, wherein said step of selecting a method comprises determining that no further communication should take place between the first and second nodes when no match is found between the first preference list and the second preference list.

11. An apparatus for determining whether a security service will be used in a networked computer environment comprising:

a first node configured to select a first preference value for the security service;

a second node configured to select a second preference value for the security service; at least one of the first or second preference values being selected from a set comprising a value representing that the security service is required, a value representing that the security service is rejected, a first intermediate value representing that the security service is preferred but is not essential, and a second intermediate value representing that the security service is not preferred but will be tolerated, said second node further configured to receive the first preference value and determine whether the security service will be used by comparing the first preference value with the second preference value, to determine that the security service will be used when neither the first or second preference values represents that the security service is rejected and both preference values do not include the second intermediate value, to determine that the security service will not be used and that communication between the first and second nodes should proceed when both preference values include the second intermediate value, or when one preference value represents that the security service is rejected and the other preference value does not represent that the security service is required, and to determine that communication between the first and second nodes should not proceed when one of the preference values includes the value representing that the security service is required and the other preference value includes the value representing that the security service is rejected; and a network connecting said first node and said second node, and adapted to transmit from said first node to said second node the first preference value.

12. The apparatus of claim 11, wherein:

the first node is further configured to create a first preference list including one or more acceptable methods for the security service, the first preference list including the first preference value;

the second node is further configured to create a second preference list including one or more acceptable methods for the security service, the second preference list including the second preference value; and the second node is further configured to receive the first preference list from the network and to select a method for the security service by comparing the first preference list with the second preference list.

13. The apparatus of claim 12, wherein the first preference value is included in the first preference list by selecting members of the first preference list from a set which includes a null value, and by ordering the first preference list according to priority, and wherein the null value represents not using the security service, and the position of the null value in the ordered preference list indicates the first preference value.

14. A computer-readable medium which can be used to direct a computer node in a networked computer environment to determine whether a security service will be used for communication between a first node and a second node, comprising:

means for directing the first node to select a first preference value;

means for directing a second node to select a second preference value, at least one of the first or second preference values being selected from a set comprising a value representing that the security service is required, a value representing that the security service is rejected, a first intermediate value representing that the security service is preferred but is not essential, and a second intermediate value representing that the security service is not preferred but will be tolerated;

means for directing the first node to transmit the first preference value to the second node;

means for directing the second node to determine whether the security service will be used by comparing the first preference value with the second preference value, to determine that the security service will be used when neither the first or second preference values represent that the security service is rejected and both preference values do not include the second intermediate value, and to determine that the security service will not be used and that communication between the first and second nodes should proceed when both preference values include the second intermediate value, or when one preference value represents that the security service is rejected and the other preference value does not represent that the security service is required; and means for directing the second node to find that communication between the first and second nodes should not proceed when one of the preference values includes the value representing that the security service is required and the other Preference value includes the value representing that the security service is rejected.

15. The computer-readable medium of claim 14, further comprising:

means for directing the first node to create a first preference list including one or more acceptable methods for the security service, the first preference list including the first preference value;

means for directing the second node to create a second preference list including one or more acceptable methods for the security service, the second preference list including the second preference value;

means for directing the network to transmit the first preference list to the second node; and means for directing the second node to select a method for the security service by comparing the first preference list with the second preference list.

16. The apparatus of claim 15, wherein the first preference value is included in the first preference list by selecting members of the first preference list from a set which includes a null value, and by ordering the preference list according to priority, and wherein the null value represents not using the security service, and the position of the null value in the ordered preference list indicates the first preference value.

17. The process of claim 16, wherein the first preference value represents that the security service is required when the null value is not present in the preference list, the first preference value represents that the security service is rejected when the null value is the only method present in the preference list, the first preference value is the first intermediate value when the null value is positioned as the highest priority method in the preference list, and the first preference value is the second intermediate value when the null value is positioned as the lowest priority method in the preference list.

18. The process of claim 4, wherein the first preference value represents that the security service is required when the null value is not present in the preference list, the first preference value represents that the security service is rejected when the null value is the only method present in the preference list, the first preference value is the first intermediate value when the null value is positioned as the highest priority method in the preference list, and the first preference value is the second intermediate value when the null value is positioned as the lowest priority method in the preference list.

19. The process of claim 18 wherein the security service is encryption and the methods for the security service comprise algorithms for encryption.

20. The process of claim 9 wherein the first preference list includes the null value and includes no other methods for the security service when the security service must not be used by the first node.

21. The process of claim 20 wherein the first preference list includes the null value in the highest priority position and includes one or more methods for the security service in lower priority positions when the security service is not essential but is preferred by the first node.

22. The process of claim 21 wherein the first preference list includes the null value in the lowest priority position and includes one or more methods for the security service in higher priority positions when the security service is not preferred but will be tolerated by the first node.

23. The process of claim 22 wherein the security service is encryption and the methods for the security service comprise algorithms for encryption.

24. The apparatus of claim 13 wherein the first preference value represents that the security service is required when the null value is not present in the preference list, the first preference value represents that the security service is rejected when the null value is the only method present in the preference list, the first preference value is the first intermediate value when the null value is positioned as the highest priority method in the preference list, and the first preference value is the second intermediate value when the null value is positioned as the lowest priority method in the preference list.

25. An apparatus for determining whether a security service will be used in a networked computer environment comprising:

a first node configured to create a first preference list;

a second node configured to create a second preference list, wherein the first and second preference lists include acceptable methods for the security service, each of the first and second preference lists being ordered by priority and includes a null value when the security service is not essential, the null value representing not using the security service, and the position of the null value in each ordered preference list indicates strength of preference for not using the security service; and a network connecting said first and second nodes, and adapted to communicate between the first and second node at least one of the first and second preference lists, wherein said second node is further configured to compare the first preference list with the second preference list, to determine that the security service will be used when both the first and second preference lists include methods other than the null value, both preference lists do not indicate that the security service is not preferred but will be tolerated, and a match is found between the first and second preference lists; and to select a method for the security service by selecting a method contained in both preference lists.

26. The apparatus of claim 25, wherein said second node is further configured to determine that no further communication should take place between the first and second nodes when no match is found between the first preference list and the second preference list.

27. A computer-readable medium which can be used to direct a computer node in a networked computer environment to determine whether a security service will be used during communication between a first node and a second node and to select a method for the security service, comprising:

means for directing the first node to create a first preference list;

means for directing the second node to create a second preference list, the first and second preference lists including acceptable methods for the security service, each of the first and second preference lists being ordered by priority and includes a null value when the security service is not essential, wherein the null value represents not using the security service, and the position of the null value in each ordered preference list indicates strength of preference for not using the security service;

means for directing the first node to communicate the first preference list to the second node;

means for directing the second node to compare the first preference list with the second preference list;

means for directing the second node to determine that the security service will be used when both the first and second preference lists include methods other than the null value, both preference lists do not indicate that the security service is not preferred but will be tolerated, and a match is found between the first and second preference lists; and means for directing the second node to select a method for the security service by selecting a method contained in both preference lists.

28. The computer-readable medium of claim 27 further comprising means for directing the second node to determine that no further communication should take place between the first and second nodes when no match is found between the first preference list and the second preference list.

* * * * *